(12) United States Patent
Plesternings et al.

(10) Patent No.: US 7,559,585 B2
(45) Date of Patent: Jul. 14, 2009

(54) SUPPORT FRAME FOR HEADER LATCH ASSEMBLY

(75) Inventors: Frank Plesternings, Hartland, MI (US); Travis White, Hartland, MI (US)

(73) Assignee: Wilhelm Karmann GmbH, Osnabruck (DE)

( * ) Notice: Subject to any disclaimer, the term of this patent is extended or adjusted under 35 U.S.C. 154(b) by 304 days.

(21) Appl. No.: 11/201,455

(22) Filed: Aug. 11, 2005

(65) Prior Publication Data

US 2006/0038411 A1 Feb. 23, 2006

Related U.S. Application Data

(60) Provisional application No. 60/603,331, filed on Aug. 20, 2004, provisional application No. 60/603,351, filed on Aug. 20, 2004.

(51) Int. Cl.
*E05C 3/06* (2006.01)
*B60J 7/08* (2006.01)

(52) U.S. Cl. .................. 292/201; 292/44; 292/50; 292/51; 292/216; 292/DIG. 23; 296/121

(58) Field of Classification Search .................. 292/44, 292/50, 51, 101, 108, 195, 199, 201, 202, 292/210, 216, 280, 286, DIG. 23, 54, 95, 292/96, 296; 296/121
See application file for complete search history.

(56) References Cited

U.S. PATENT DOCUMENTS

| 2,285,301 A | * | 6/1942 | Nelson | ........................ 292/126 |
|---|---|---|---|---|
| 2,709,621 A | | 5/1955 | Votypka et al. | |
| RE24,375 E | | 10/1957 | Thompson, III | |
| 2,831,718 A | | 4/1958 | Hallek et al. | |
| 2,852,292 A | | 9/1958 | Galla | |
| 3,004,788 A | | 10/1961 | Dulley et al. | |
| 3,089,719 A | | 5/1963 | Csizmansky | |
| 3,216,763 A | | 11/1965 | Heincelman | |
| 3,342,525 A | | 9/1967 | Griffin | |
| 3,348,876 A | | 10/1967 | Pollack et al. | |
| 4,273,368 A | * | 6/1981 | Tanaka | ........................ 292/53 |
| 4,476,700 A | * | 10/1984 | King | .............................. 70/99 |
| 4,544,189 A | * | 10/1985 | Fiordellisi et al. | ............. 292/50 |
| 4,664,436 A | | 5/1987 | Eyb et al. | |
| 4,796,932 A | * | 1/1989 | Tame | ......................... 292/112 |
| 4,830,425 A | * | 5/1989 | Muscat | ....................... 296/121 |
| 4,830,426 A | | 5/1989 | Schlachter et al. | |
| 4,958,508 A | * | 9/1990 | Lin | .............................. 70/352 |

(Continued)

FOREIGN PATENT DOCUMENTS

DE          1 730 476          9/1956

(Continued)

*Primary Examiner*—Carlos Lugo
(74) *Attorney, Agent, or Firm*—Gifford, Krass, Sprinkle, Anderson & Citkowski, P.C.

(57) ABSTRACT

A latch assembly is provides selective locking of a front portion of a convertible top to a windshield header. The latch assembly includes a latch mechanism, an actuator and a frame. The latch mechanism has a hook movable between locked and unlocked states with a striker bar on the front portion of the convertible top. The actuator is operatively coupled to the latch mechanism for actuating the hook between locked and unlocked states. The frame supports both the latch mechanism and the actuator so that the entire latch assembly can be assembled to the windshield header as a unit.

25 Claims, 13 Drawing Sheets

U.S. PATENT DOCUMENTS

| | | | |
|---|---|---|---|
| 5,026,110 A | 6/1991 | Koop et al. | |
| 5,042,869 A | 8/1991 | Brin et al. | |
| 5,046,767 A | 9/1991 | Muscat | |
| 5,058,939 A | 10/1991 | Miilu | |
| 5,085,483 A | 2/1992 | Alexander | |
| 5,154,479 A | 10/1992 | Sautter, Jr. | |
| 5,269,586 A | 12/1993 | Hahn et al. | |
| 5,284,378 A | 2/1994 | Sautter, Jr. | |
| 5,301,987 A | 4/1994 | Tokarz et al. | |
| 5,328,229 A | 7/1994 | Brandt et al. | |
| 5,487,289 A * | 1/1996 | Otto et al. | 70/279.1 |
| 5,595,407 A | 1/1997 | ter Horst et al. | |
| 5,678,881 A | 10/1997 | Tokarz | |
| 5,700,043 A * | 12/1997 | Rohard et al. | 292/256.6 |
| 5,755,467 A | 5/1998 | Dilluvio et al. | |
| 5,772,275 A | 6/1998 | Tokarz | |
| 5,839,778 A | 11/1998 | Schaible et al. | |
| 5,901,989 A * | 5/1999 | Becken et al. | 292/35 |
| 5,944,375 A | 8/1999 | Schenk et al. | |
| 5,992,188 A * | 11/1999 | Saunders | 70/120 |
| 6,030,019 A * | 2/2000 | Stiltner et al. | 296/57.1 |
| 6,033,008 A | 3/2000 | Mattila et al. | |
| 6,048,021 A | 4/2000 | Sautter, Jr. | |
| 6,155,614 A | 12/2000 | Lange | |
| 6,213,534 B1 | 4/2001 | Mac Farland et al. | |
| 6,419,297 B2 | 7/2002 | Haberl et al. | |
| 6,585,310 B1 | 7/2003 | Guillez et al. | |
| 6,595,574 B2 | 7/2003 | Shaw et al. | |
| 6,672,646 B2 | 1/2004 | Obendiek et al. | |
| 6,746,073 B2 | 6/2004 | Heller et al. | |
| 6,758,511 B2 | 7/2004 | Taylor et al. | |
| 6,786,529 B2 | 9/2004 | Hasselgruber et al. | |
| 6,799,789 B2 | 10/2004 | Guillez et al. | |
| 6,832,807 B2 | 12/2004 | Tezuka et al. | |
| 6,834,907 B2 | 12/2004 | Dietl et al. | |
| 7,021,696 B2 | 4/2006 | Doncov et al. | |
| 7,029,053 B2 | 4/2006 | Heller et al. | |
| 2004/0021339 A1 * | 2/2004 | Taylor et al. | 296/121 |
| 2004/0094988 A1 | 5/2004 | Doncov et al. | |
| 2004/0169394 A1 | 9/2004 | Obendiek et al. | |
| 2004/0201243 A1 | 10/2004 | Hasselgruber et al. | |
| 2005/0140165 A1 | 6/2005 | Heller et al. | |
| 2005/0242617 A1 | 11/2005 | Guillez et al. | |

FOREIGN PATENT DOCUMENTS

| | | |
|---|---|---|
| DE | 94 08 287 | 11/1995 |
| DE | 10105771 | 9/2002 |
| DE | 102 24 097 | 12/2003 |
| WO | WO 92/00204 | 1/1992 |

* cited by examiner

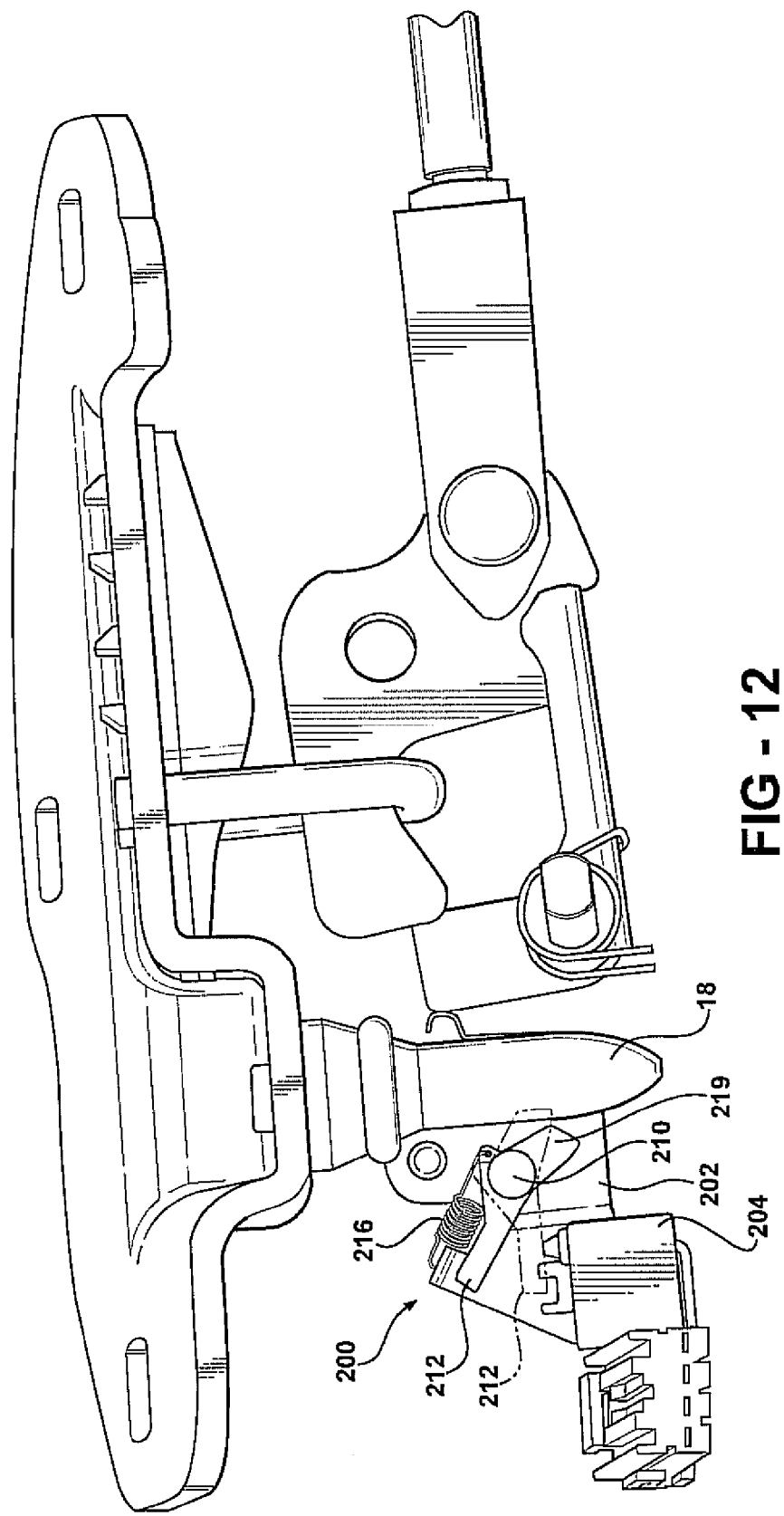

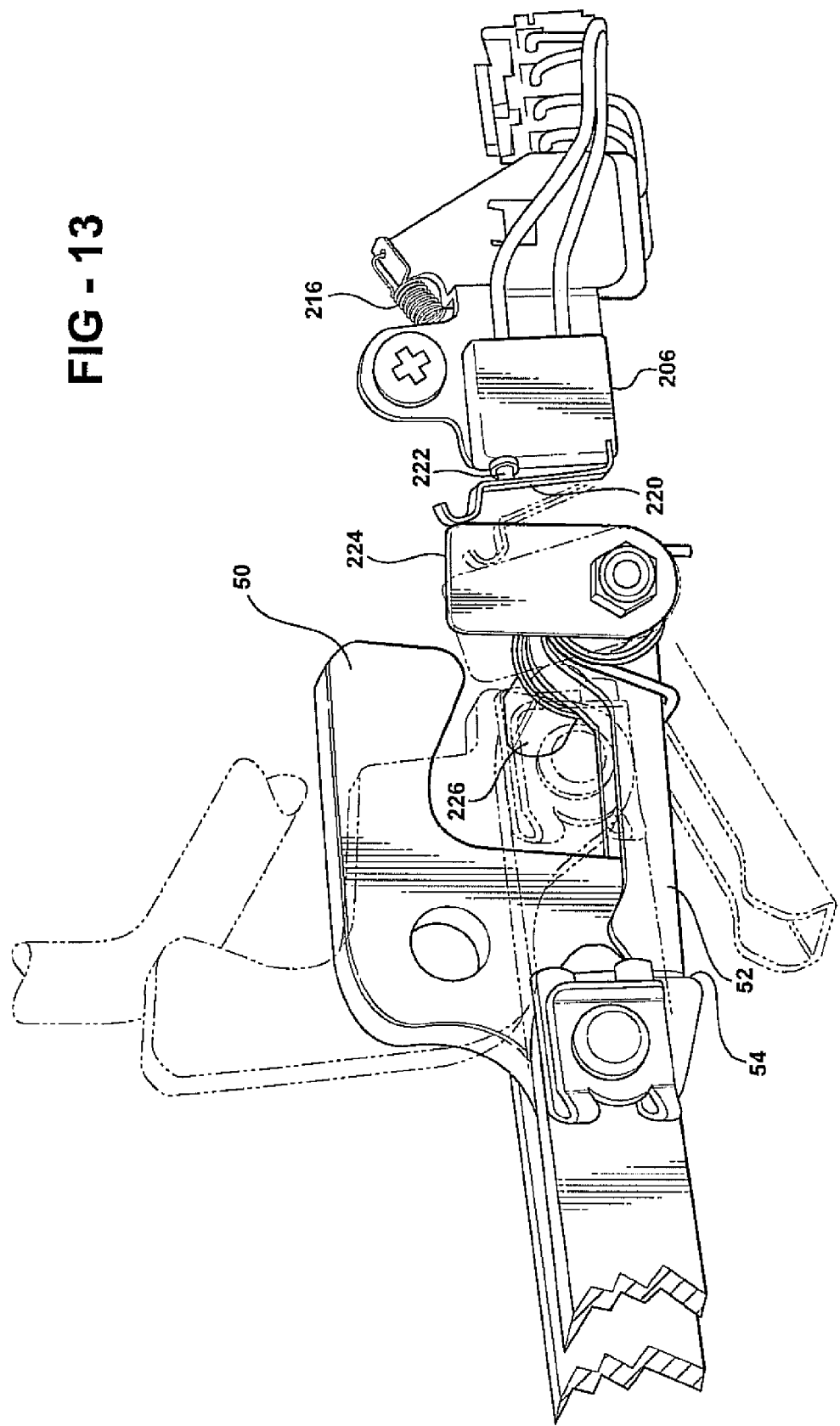

SUPPORT FRAME FOR HEADER LATCH ASSEMBLY

CROSS REFERENCE TO RELATED APPLICATION

This application claims priority from U.S. Provisional Patent Application Ser. Nos. 60/603,331 and 60/603,351, both of which were filed on Aug. 20, 2004. The content of these applications are incorporated herein by reference in their entirety.

BACKGROUND OF THE INVENTION

1. Field of the Invention

The invention relates to a latch assembly that allows selective locking of a front portion of a convertible top to a header portion of a vehicle windshield. More particularly, the invention relates to a one-piece frame for securing the various components of the latch mechanism to the header portion.

2. Description of the Related Art

Convertible vehicles include convertible tops that are moveable between an extended position and a retracted position. In the extended position, a front portion of the convertible top is aligned with a header portion of a windshield. Locking or latching devices are widely known in the art for locking the front portion of the convertible top against the header portion of the windshield. Typically, these latching mechanisms are either manually or electric-motor driven. The bulk of the latching mechanism is typically disposed along the header portion of the windshield.

It always remains desirable to provide a latching mechanism that is cheaper, lighter, easier to assemble and more robust over conventional latching assemblies. It is also becoming increasingly important to provide a latching assembly that is more compact in terms of packaging size, in order to allow the new design of a header portion or windshield having a slim profile. The slim profile allows the design of a more aerodynamically efficient vehicle.

SUMMARY OF THE INVENTION

According to one aspect of the invention, a latch assembly is provided for selectively locking a front portion of a convertible top to a windshield header. The latch assembly includes a pair of latch mechanisms, a pair of arms, a pinion gear, an actuator and a frame. The pair of latch mechanisms are lockingly engagable with corresponding striker bars on the front portion of the convertible top. The pair of arms is coupled to the latch mechanisms for moving the latch mechanisms between locked and unlocked position relative to the striker in response to a substantially axial displacement of the arms. The arms have opposing and spaced apart gear racks. The pinion gear is engaged between the gear racks of the arms so that the movement of one arm in one direction causes movement of the other arm in an opposite direction. The actuator is coupled to one of the arms to cause actuation of the locking mechanism between locked and unlocked positions. The frame supports the latch mechanisms, the arms, the pinion gear and the actuator so that the entire latch assembly can be assembled to the windshield header as a unit.

According to another embodiment of the invention, a latch assembly is provided for selectively locking a front portion of a convertible top to a windshield header. The latch assembly includes a pair of latch mechanisms, an actuator and a frame. Each latch mechanism has a hook movable between locked and unlocked states with a striker bar on the front portion of the convertible top. The actuator is operatively coupled between the latch mechanisms for actuating the hooks between locked and unlocked states. The frame supports both the latch mechanisms and the actuator so that the entire latch assembly can be assembled to the windshield header as a unit.

According to another aspect of the invention, a latch assembly is provided for selectively locking a front portion of a convertible top to a windshield header. The latch assembly includes a pair of latch mechanisms, a pair of arms, a pinion gear and an actuator. The pair of latch mechanisms is lockingly engagable with corresponding striker bars on the front portion of the convertible top. The pair of arms is coupled to the latch mechanisms for moving the latch mechanisms between locked and unlocked position relative to the striker in response to a substantially axial displacement of the arms. The arms have opposing and spaced apart gear racks. The pinion gear is engaged between the gear racks of the arms so that the movement of one arm in one direction causes movement of the other arm in an opposite direction. The actuator is coupled to one of the arms to cause actuation of the locking mechanism between locked and unlocked positions.

According to another aspect of the invention, a latch assembly is provided for selectively locking a front portion of a convertible top to a windshield header. The latch assembly includes a latch mechanism and an arm. The latch mechanism has a hook lockingly engagable with a striker bar on the front portion of the convertible top. The latch mechanism further has a lever movable in and out of engagement with an edge on the hook. The lever maintains the hook in a locked position with the striker bar while engaged with the edge. The arm is coupled to the latch mechanism. The arm is movable between locked and unlocked positions to cause corresponding movement of the hook in and out of the locked position. The arm has a cam surface engagable with the lever. The arm and the hook are coupled together in a lost motion arrangement so that the cam surface first displaces the lever from the edge of the hook during movement of the arm from the locked position prior to moving the hook from the locked position.

BRIEF DESCRIPTION OF THE FIGURES

FIG. 12 is front elevational view of the latch mechanism according to the second embodiment of the invention; and FIG. 13 is a rear elevational view of the latch mechanism according to the second embodiment of the invention, with a locked position shown in solid lines and an unlocked position shown in phantom lines.

DETAILED DESCRIPTION OF THE INVENTION

Figure 1:
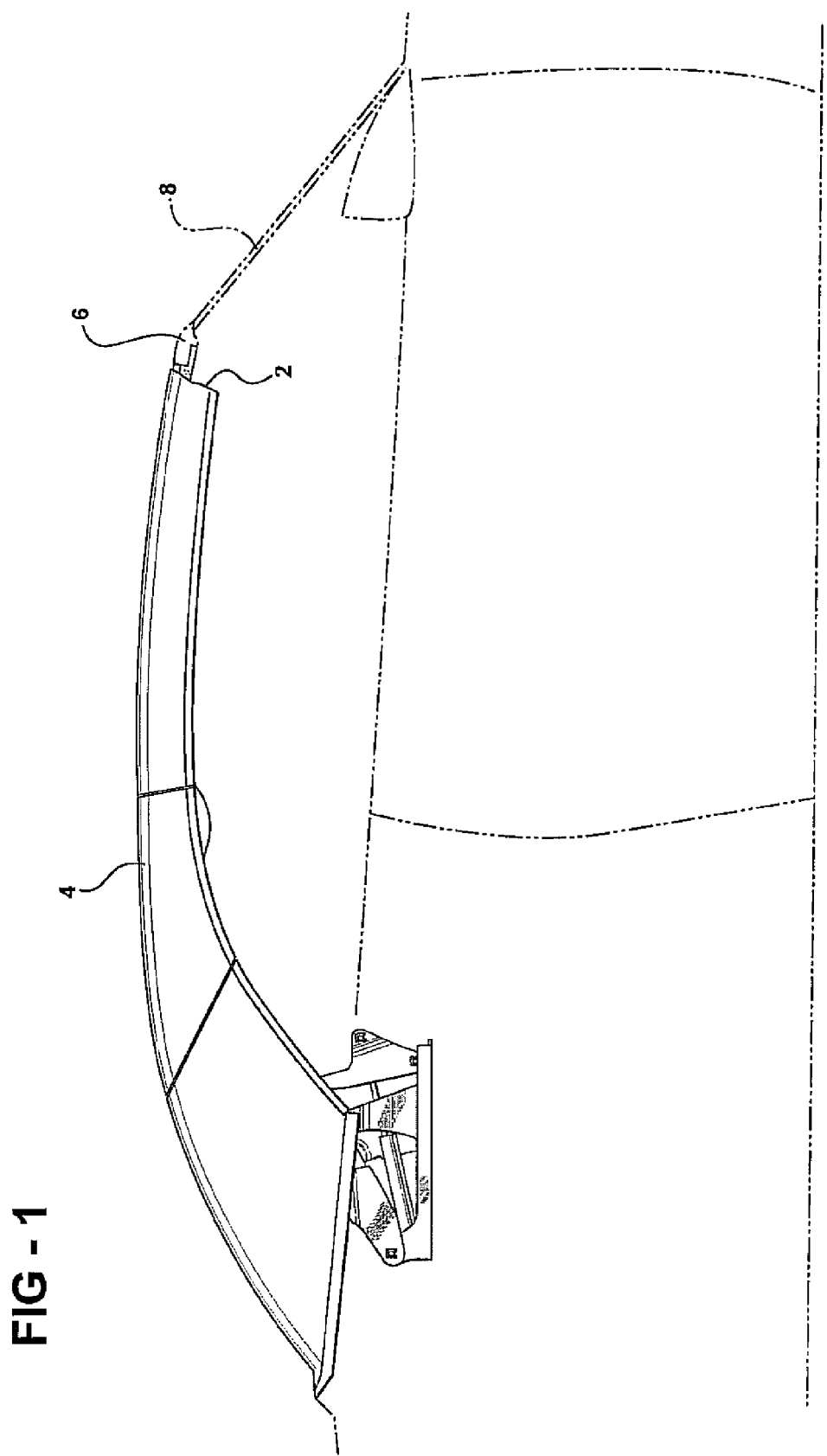
FIG. 1 is a side elevational view of a convertible vehicle incorporating a header latch system according to one embodiment of the invention.

Convertible automobiles have retractable tops that are movable between a retracted position disposed in a storage space behind a passenger compartment and an extended position covering the passenger compartment. The present invention discloses a unique latching assembly that allows selective locking and unlocking of a front portion 2 of the convertible top 4 to a header portion 6 of a windshield 8 when the convertible top 4 is in the extended position, as shown in FIG. 1. Further, the present invention also provides a support frame for supporting the latch assembly on the header 6 of the windshield 8.

Figure 2:
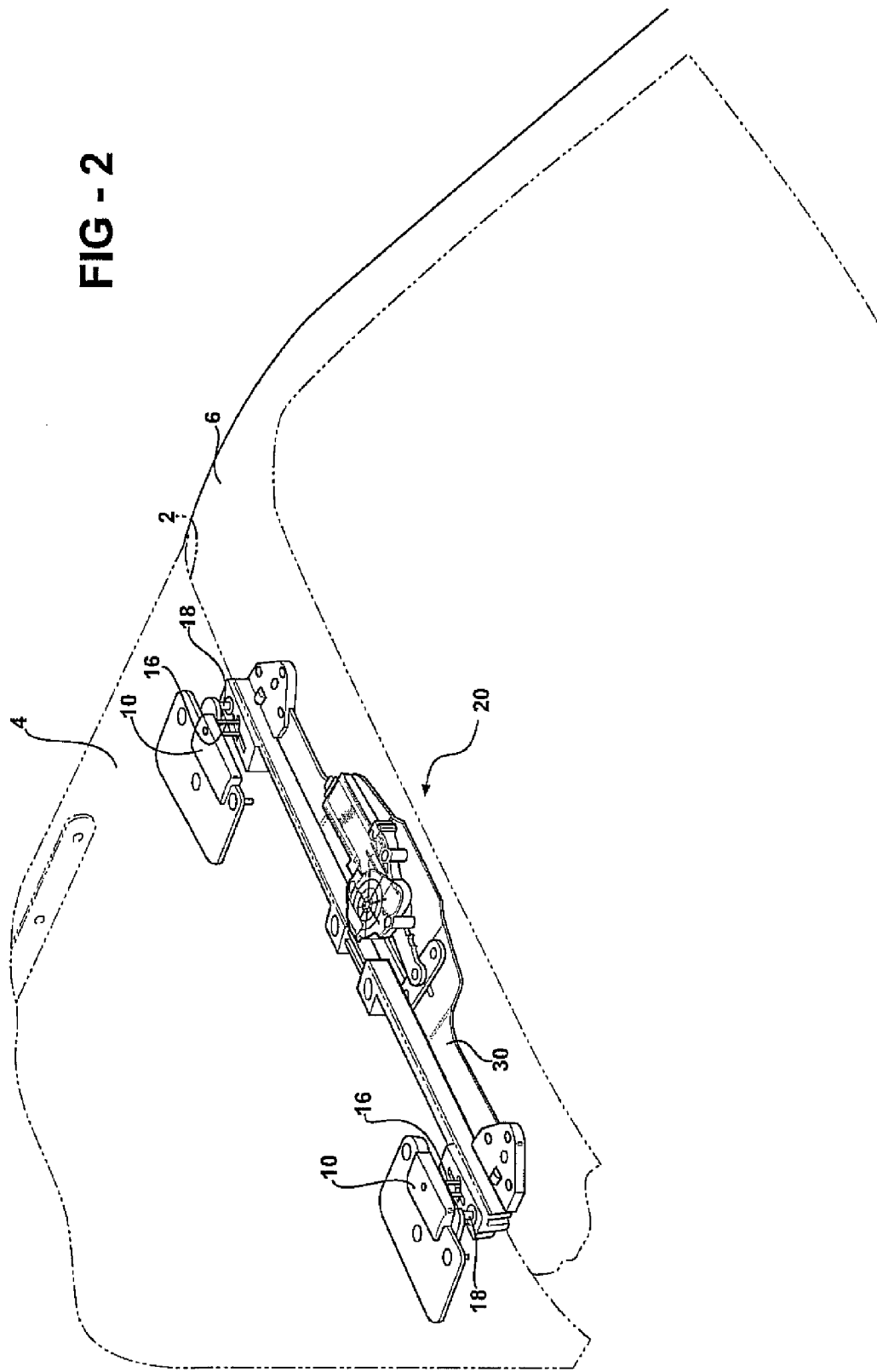
FIG. 2 is a partial top perspective view of the vehicle with the header latch system locked to a header of the windshield.

Referring to FIG. 2, a pair of spaced apart mounting brackets 10 is fixedly secured to the front portion 2 of the convertible top 4. A striker bar 16 extends outwardly from each mounting bracket 10. Each striker bar 16 is generally U-shaped with ends thereof being fixedly secured to one of the respective mounting brackets 10. A locator pin 18 protrudes outwardly from each mounting bracket 10.

The latch assembly, generally indicated at 20, is fixedly secured to the header portion 6 of the windshield 8. The latch assembly 20 includes a latch mechanism that lockingly engages the striker bar 16 to retain the front portion 2 of the top 4 against the header portion 6. Described in greater detail below, the latch assembly 20 includes a support frame 30 that supports the various components of the latch assembly 20 and allows the entire latch assembly 20 to be assembled to the header portion 6 as a unit.

Figure 3:
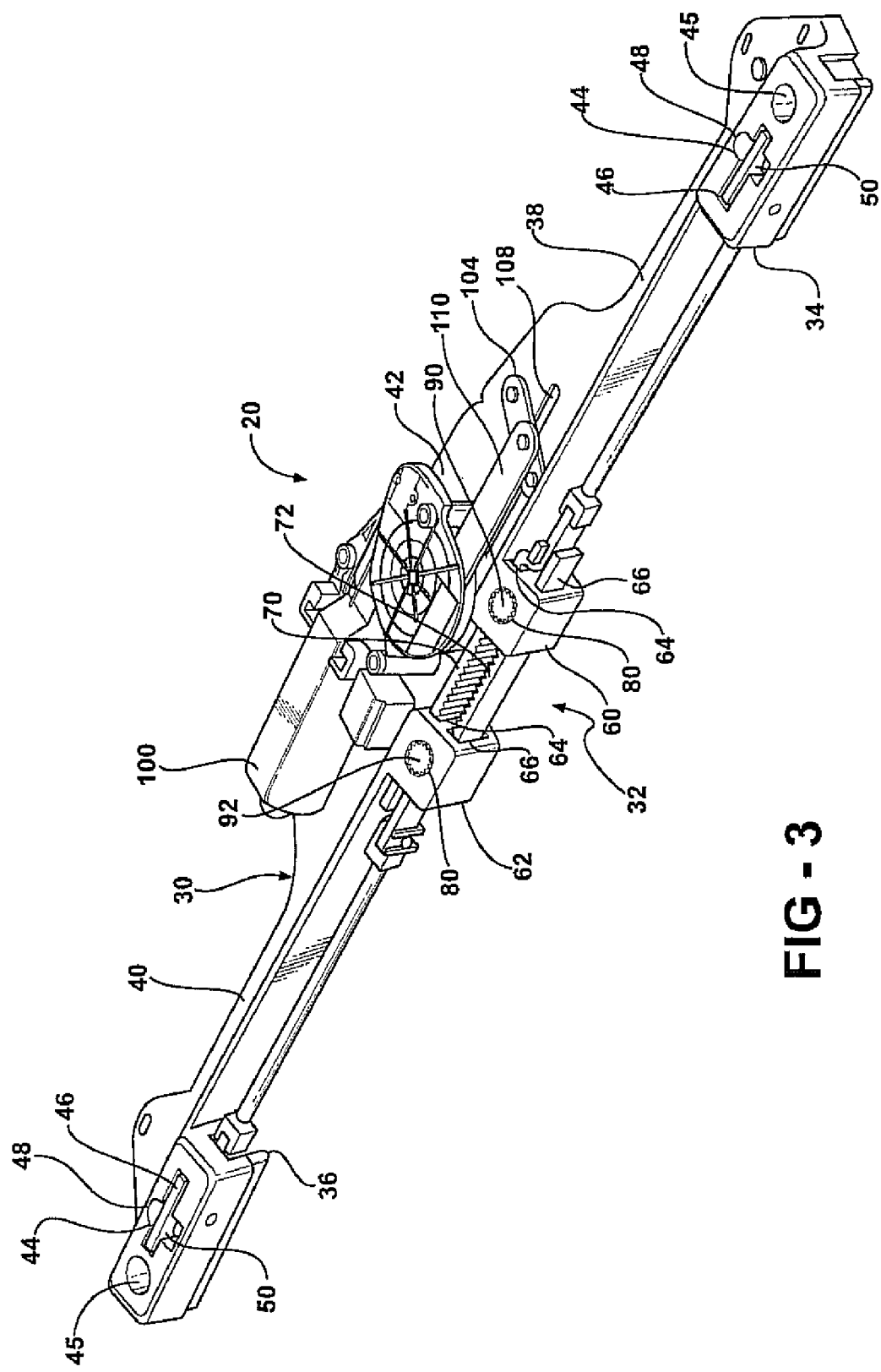
FIG. 3 is a top perspective view of the header latch system.
Figure 4:
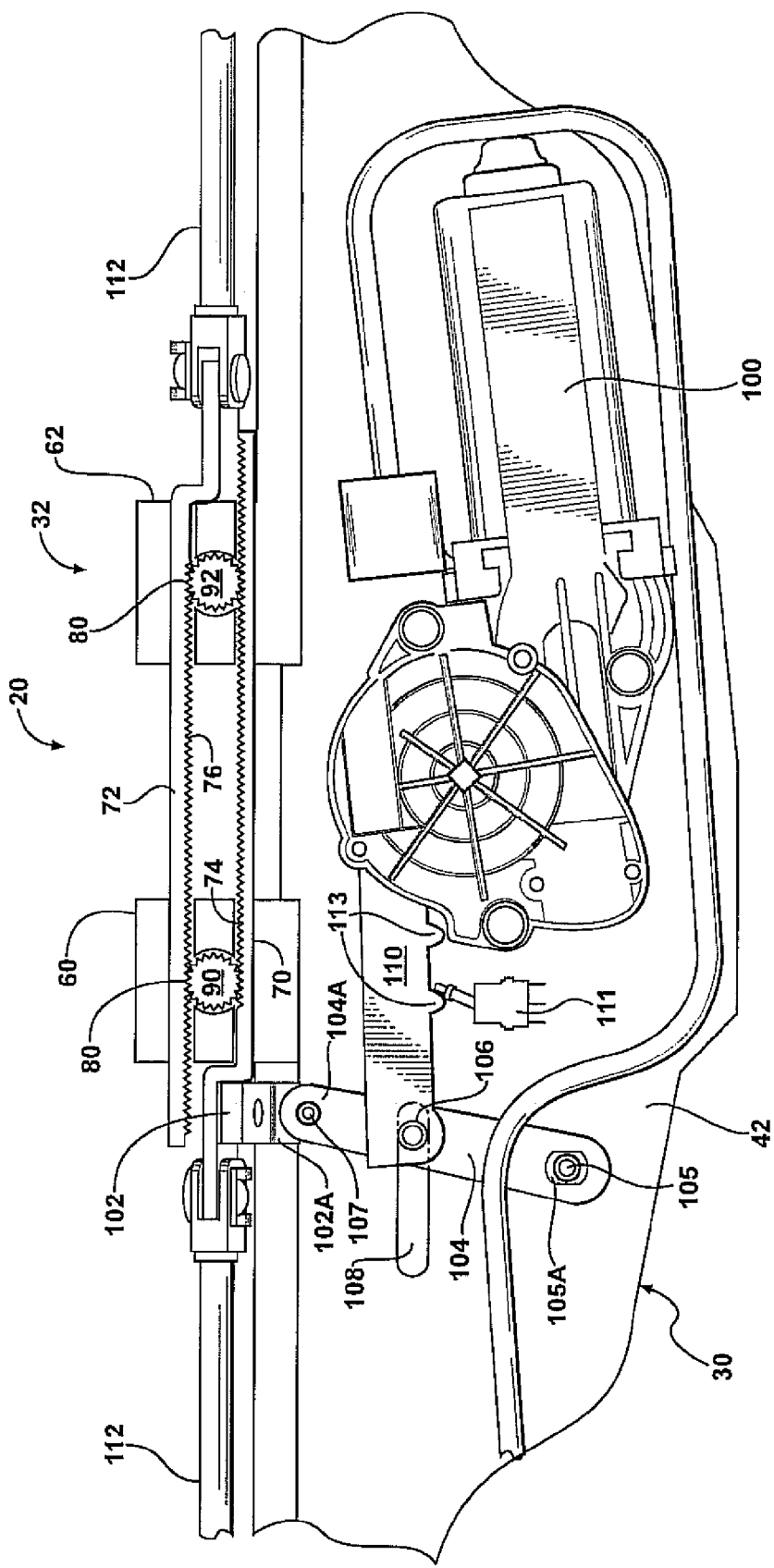
FIG. 4 is an enlarged top elevational view of a portion of the header latch system.
Figure 5:
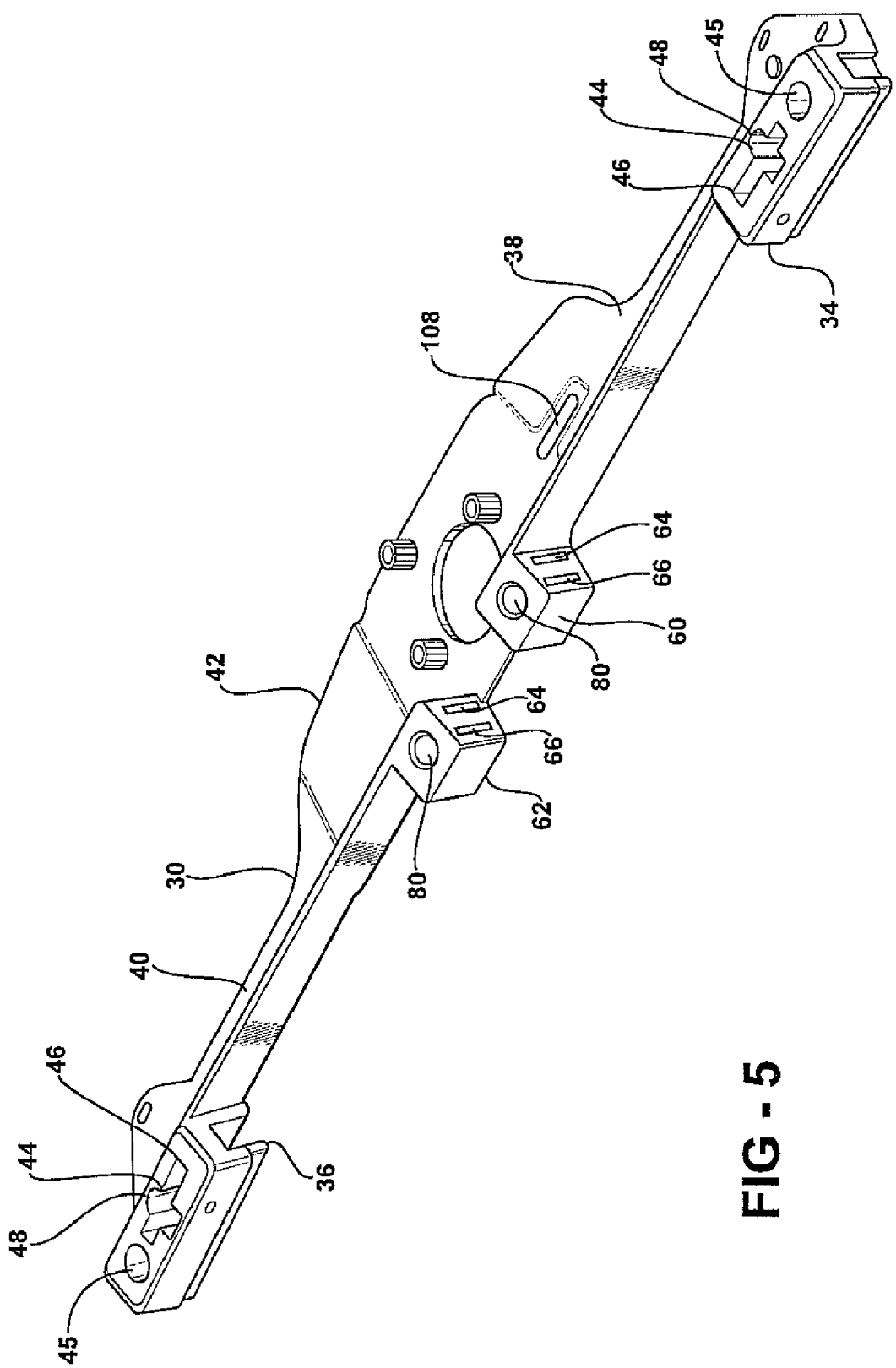
FIG. 5 is a top perspective view of a support frame that supports the components of the header latch system.
Figure 6:
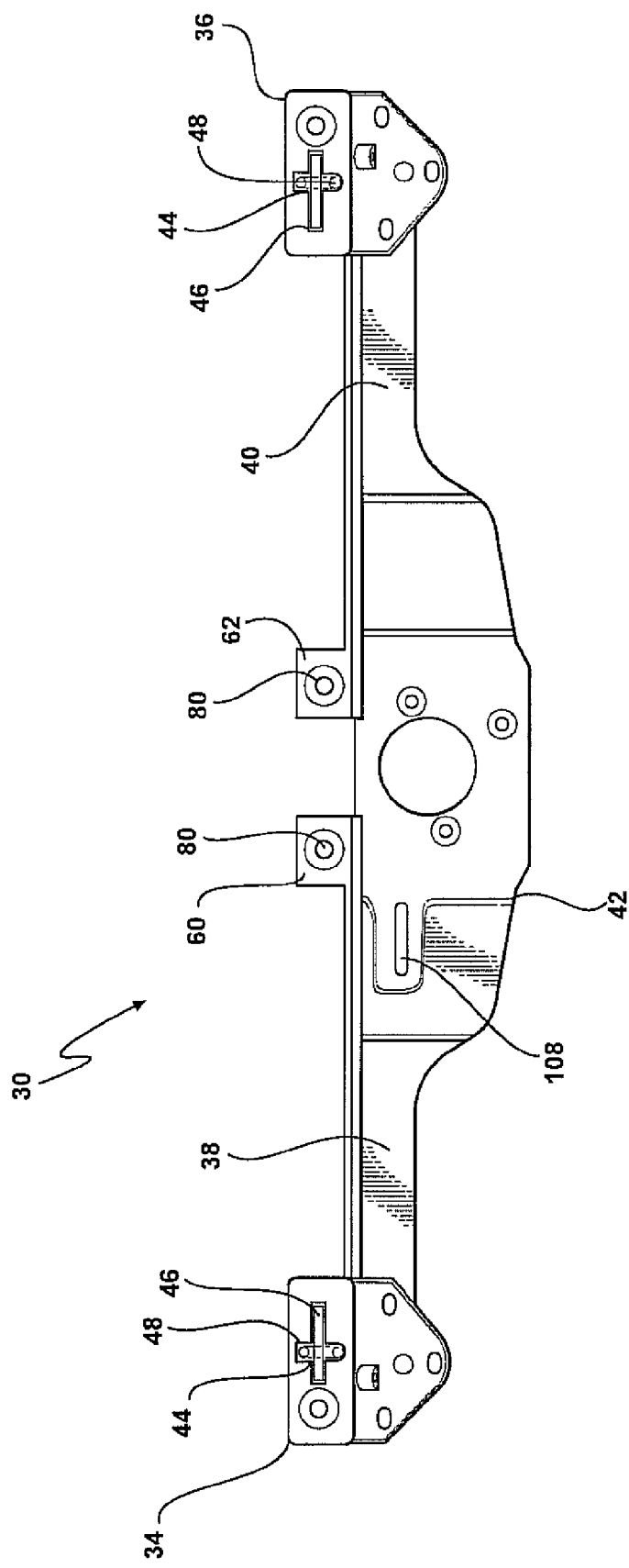
FIG. 6 is a top elevational view of a support frame that supports the components of the header latch system.

Referring to FIGS. 3-5, the support frame 30 includes a gear housing 32 and a pair of latch housings 34, 36. The gear housing 32 of the support frame 30 is positioned between the latch housings 34, 36. The support frame 30 includes arms 38, 40 that extend between the gear housing 32 and respective latch housings 34, 36. A generally planar support wall 42 extends outwardly from the gear housing 32.

Each latch housing 34, 36 supports one of the latch mechanisms. Each latch housing 34, 36 includes a top surface and a first opening 44 defined in the top surface. The first opening 44 extends substantially through the latch housing 34, 36. The first opening 44 has a cross-shaped cross section with orthogonally intersecting first 46 and second 48 slots. The second slot 48 of the first opening 44 is sized to accept the striker bar 16 therethrough. The latch assembly 20 includes a hook 50 pivotally coupled to the housing 34, 36 for movement in and out of the first slot 46 between locked and unlocked positions, respectively. In the locked position, shown in FIG. 7, the hook 50 lockingly engages the striker bar 16, thereby retaining the striker bar 16 in the second slot 48. In the unlocked position, shown in FIG. 8, the hook 50 stands upright from an end of the first slot 46 to allow unhindered movement of the striker 16 in and out of the second slot 48.

A second opening 45 is formed in the top surface and extends substantially through the latch housing 34, 36. The second opening 45 is cylindrical for receiving the locating pin 18 therein as the top 4 is moved to the extended position.

Referring to FIGS. 3-5, the gear housing 32 includes at least one, but preferably a pair of gear housings 60, 62. A pair of slots 64, 66 extend through each gear housing 60, 62. The slots 64, 66 are generally parallel. Each slot 64, 66 has a rectangular cross section. The latch assembly 20 includes driving 70 and driven 72 arms slidably supported in respective slots 64, 66. Each of the driving 70 and driven 72 arms includes a longitudinally extending gear rack 74, 76. A cylindrical slot 80 extends through each gear housing 60, 62. Pinion gears 90, 92 are rotatably supported in the cylindrical slots 80. The axis of each cylindrical slot 80 is oriented orthogonally relative to the pair of slots 64, 66. The cylindrical slots 80 are cooperative with the pair of slots 64, 66 so that the pinion gears 90, 92 are continuously drivingly engaged between the gear racks 74, 76. The gear racks 74, 76 are engaged to opposite sides of the pinion gears 90, 92, so that the arms 70, 72 move together in and out of the gear housings 60, 62, i.e. the driven arm 72 moves in and out of the gear housing 62 in response to corresponding movement of the driving arm 70 in and out of the housing gear housing 60.

As shown in FIG. 4, the latch assembly 20 also includes an actuator 100 fixedly secured to the support wall 42. The actuator 100 moves the driving arm 70 in and out of the gear housings 60, 62 when the actuator 100 is activated. The actuator 100 shown in the figures is a rotary type electrical motor having an output shaft providing a rotary output. It should, however, be readily apparent that the driving arm 70 can be actuated manually via appropriate levers or knobs, or that other types of actuators can be used, such as a hydraulic cylinder. The output shaft from the actuator 100 is coupled to the driving arm 70 by a linkage. It should be readily apparent that where only a single latch mechanism is used, the actuator 100 drives only a single arm 70 and the previously described gear box arrangement is not included.

The linkage includes an L-shaped bracket 102 fixedly secured to the driving arm 70. The bracket 102 has a distal end 102a. A control arm 104 is pivotally coupled to the support wall 42 by a pivot pin 105. The control arm 104 has a distal end 104a pivotally coupled to the distal end 102a of the bracket 102 by a pivot pin 107. A disc or radial arm (not shown) is coupled to the output shaft of the actuator 100. An output link 110 has one end pivotally coupled to the disc or radial arm and an opposite end pivotally coupled to a middle section of the control arm 104 by a pivot pin 106. The pin 106 is slidably coupled to a guide slot 108. The guide slot 108 is linear and generally tangential relative to the pivot pin 105. Thus, the guide slot 108 must be sufficiently wide to accommodate the pin 106 as it moves arcuately with the control arm 104. Alternatively, a slot 105A may be formed in the control arm 104 to allow lost motion of the arm 104 relative to the pivot pin 105 and thereby prevent binding between the pivot pin 106 as it slides along the linear guide slot 108. By this arrangement, the rotary movement of the output shaft is translated into a linear displacement of the pivot pin 106 along the guide slot 108, in turn causing linear movement of the driving arm 70 therewith. Preferably, the actuator 100 is activated by a switch located in the passenger compartment. It should be appreciated that any suitable actuator and linkage can be utilized for causing linear displacement of the driving arm 70 in and out of the gear housing 60, 62, such as a solenoid or hydraulic cylinder. However, the use of a rotary type actuator, as provided by the preferred embodiment, allows the design of a more compact latch assembly package. Optionally, a position sensor 111 engages spaced apart protrusions 113 on the output link 110 to indicate the locked and unlocked states of the latch assembly 20.

Figure 7:
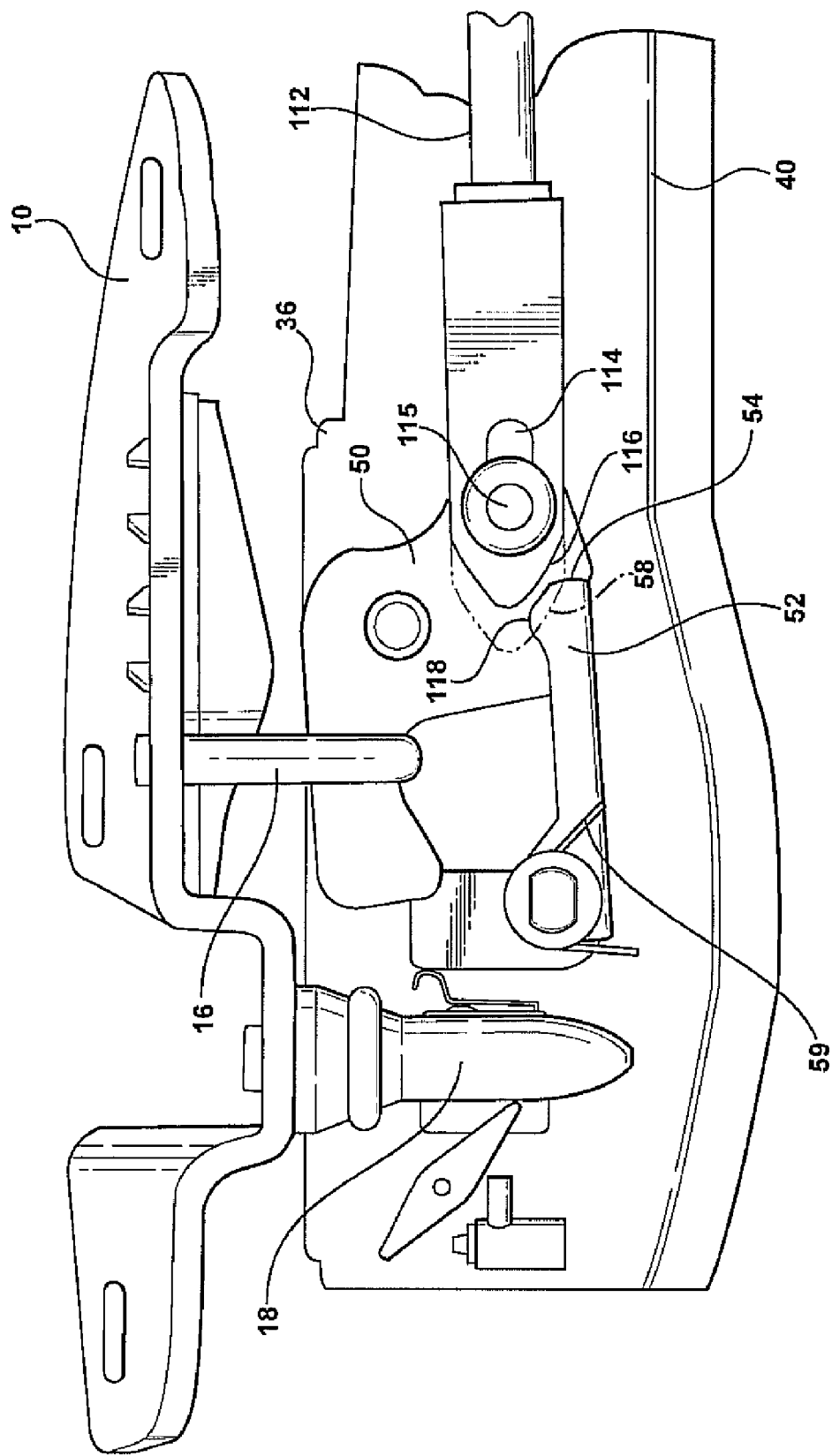
FIG. 7 is a front elevational view of a latch mechanism in a locked position.

The latch assembly also includes connecting rods 112. The connecting rods 112 connect the arms 70, 72 and the hooks 50. Specifically, as shown in FIG. 7, one end of the connecting rod 112 is rotatably coupled to the latch hook 50 and the opposite end of the connecting rod 112 is rotatably coupled to the arm 70, 72. The connecting rods 112 translate linear movement of the driving 70 and driven 72 arms into rotary movement of the latch hooks 50. Specifically, energizing the actuator 100 causes movement of the driving 70 and driven 72 arms in and out of the gear housing 60, 62, which in turn causes rotary movement of the latch hooks 50 between the locked and unlocked positions, respectively.

Figure 8:
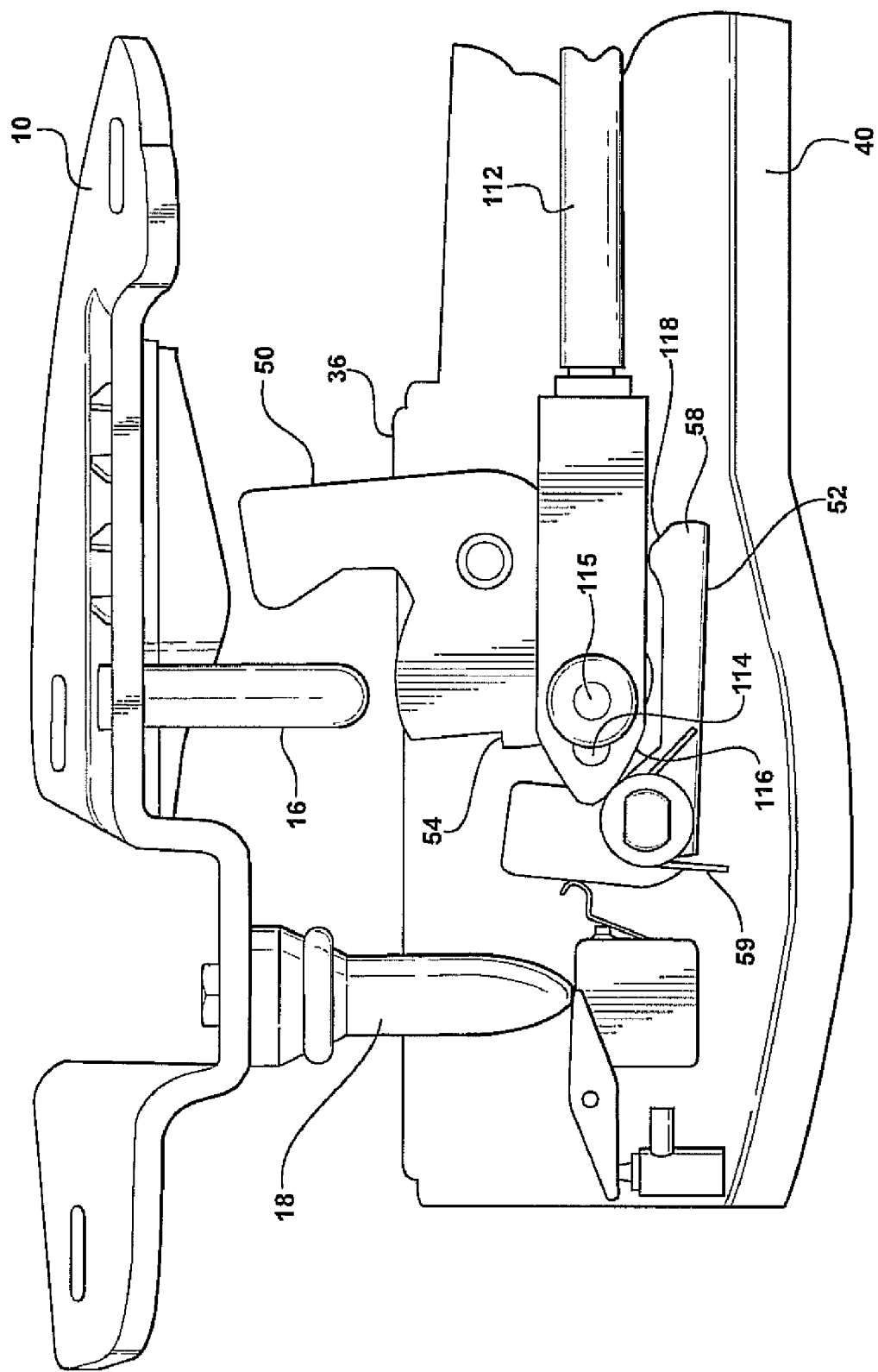
FIG. 8 is a front elevational view of the latch mechanism in an unlocked position.
Figure 9:
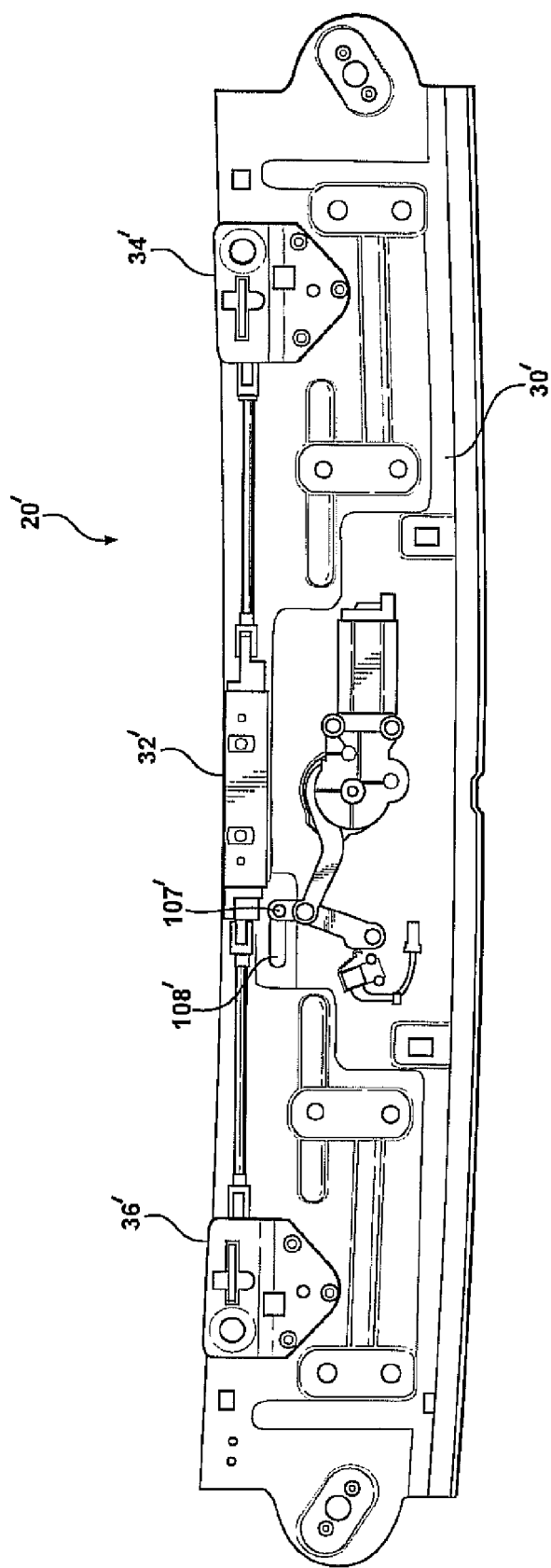
FIG. 9 is a top elevational view of the header latch system according to a second embodiment of the invention.
Figure 10:
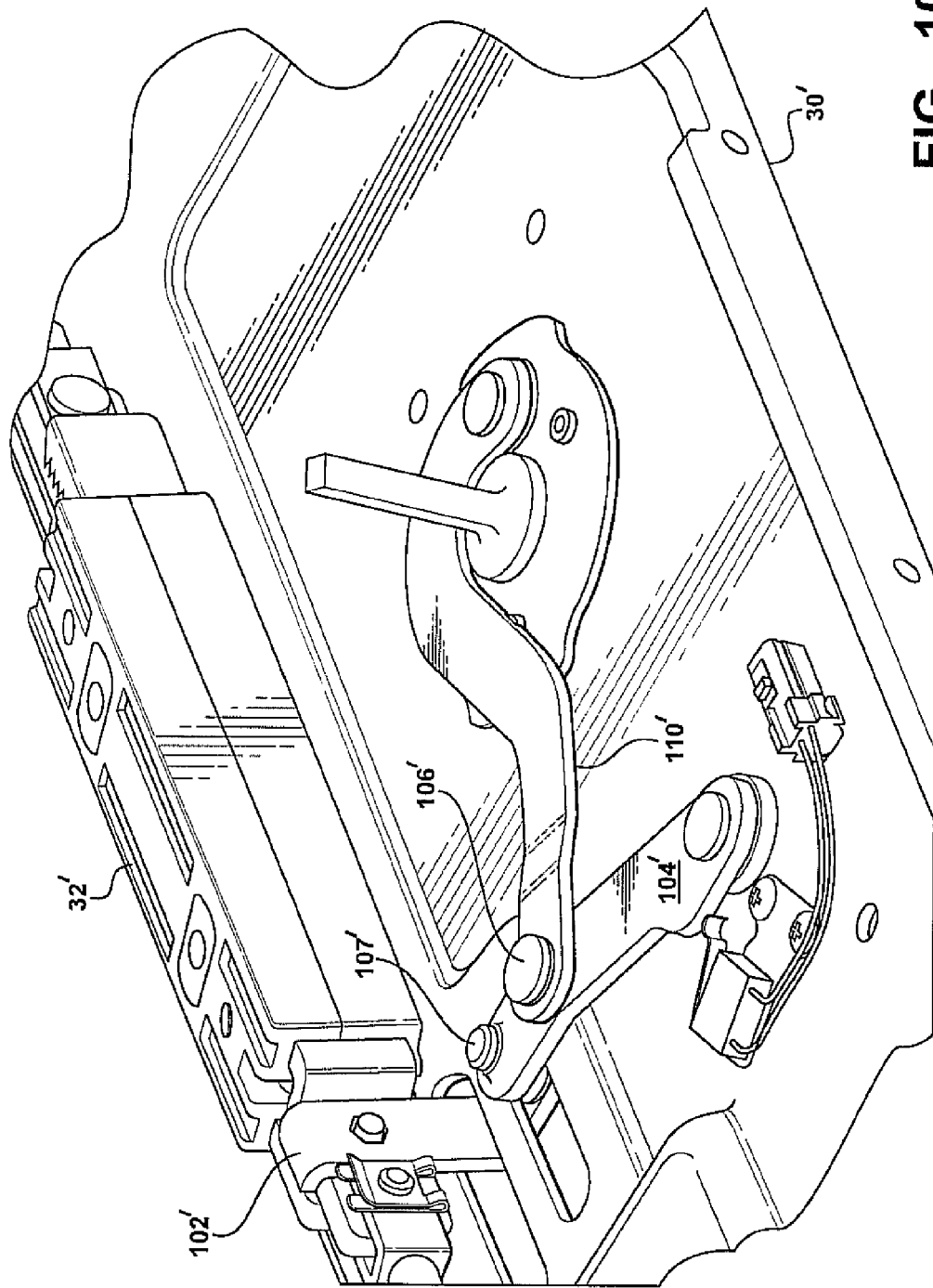
FIG. 10 is an enlarged perspective view of a portion of the header latch system of the second embodiment of the invention.

As best shown in FIGS. 7 and 8, an anti-rotation lever 52 is rotatably coupled to the latch housing 34, 36 for engaging the hook 50 to maintain it in the locked position. More specifically, the latch hook 50 includes an abutment surface or edge 54. The anti-rotation lever 52 includes a distal end 58 for engaging the abutment edge 54. While the distal end 58 remains engaged with the abutment edge 54, the hook 50 is held in the locked position without need for the rod 72 or actuator 100 to maintain their positions. A biasing member 59 is engaged between the latch housing 34 and the anti-rotation lever 52 for continuously biasing the lever 52 in a counter-clockwise direction, as viewed in FIGS. 7 and 8. The biasing member 59 continuously biases the anti-rotation lever 52 toward engagement with the abutment edge 54 of the latch hook 50 in order to maintain the hook 50 in the locked position.

The hook 50 can be moved to the unlocked position by first moving the distal end 58 out of engagement with the abutment edge 54. A slot 114 is formed in the rod 112 in proximity to the end coupled to the hook 50. More specifically, the slot 114 is oriented longitudinally along the path of movement of the rod 112. A pin 115 extends outwardly from the hook 50 and is slidably coupled to the slot 114. The end of the rod 112 also includes a cam surface 116. The cam surface 116 contacts a tab 118 on the distal end 58 of the lever 52 as the rod 112 is displaced outwardly to unlock the hooks 50. Contact between the cam surface 116 and the tab 118 moves the distal end 58 of the lever 52 away from the edge 54 of the hook 50. At the same time, the hook 50 remains in the locked position, due to the lost motion arrangement of the slot 114 and the pin 115. The amount of lost motion is indicated by the difference in position between the end of the rod 12 shown in solid line and in phantom line in FIG. 7. It should be appreciated, however, that the indicated lost motion and the size of the slot 114 are shown in an exaggerated scale for illustrative purposes only. The slot 114 needs sufficient length to allow engagement between the cam surface 116 and tab 118 to ensure that the lever 52 is disengaged with the edge 54 of the hook 50. Once the distal end 58 is removed from the edge 54 of the hook 50 and the pin 115 reaches the end of the slot 114, continued outward displacement of the rod 112 then causes rotation of the hook 50 toward the unlocked position without interference with the lever 52.

Preferably, the support frame 30 is molded from a reinforced plastic, such as glass fiber reinforced nylon. It should be appreciated, however, that the support frame can be made of any plastics or metals using any suitable method known to those having ordinary skill in the art, such as compression molding, blow molding, injection molding, casting, machining, welding, or any combination thereof.

An alternative embodiment of the invention is shown in FIGS. 9-13, wherein like components and features are indicated by primed numerals. The support frame 30' and latch housings 34', 36' are made from stamped steel and formed by conventional stamping processes. The gear housing 32' includes upper and lower housing halves that are made from plastic and formed by conventional injection molding processes. The latch housings 34', 36' and the gear housing 32' are fixedly secured to opposite ends of the support frame 30' by any suitable fixing methods known to those skilled in the art, such as bolting, welding, riveting. The guide slot 108' now slidably supports the pivot pin 107' that connects the distal ends of the bracket 102' and control arm 104' instead of pivot pin 106 in the first embodiment. In general, the latch assembly 20' functions as described in the first embodiment. Like the first embodiment, the support frame 30' allows the latch assembly 20' to be assembled to the vehicle as a complete assembly.

Figure 11:
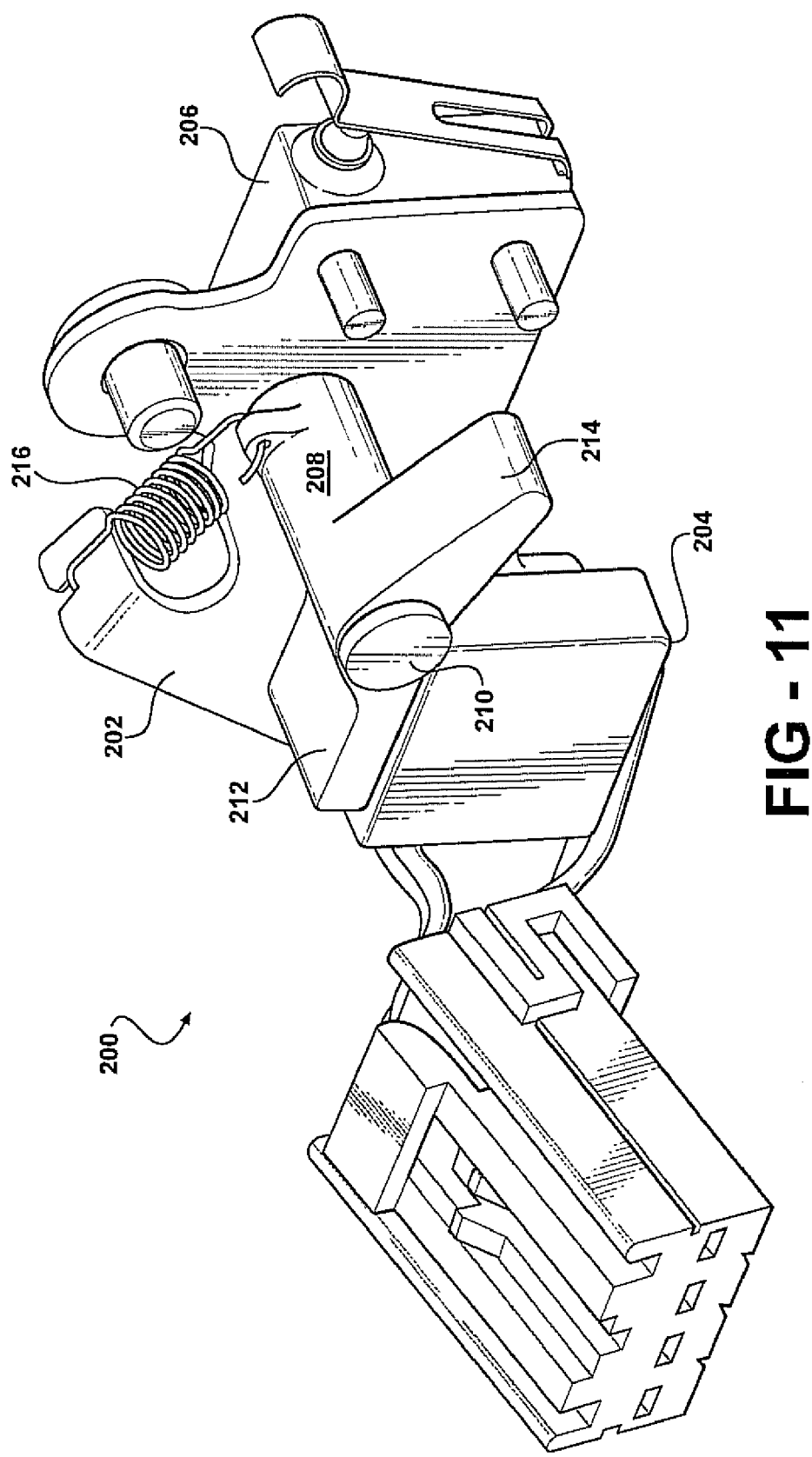
FIG. 11 is a perspective view of a switch according to the second embodiment of the invention.

Referring to FIGS. 11-13, a position switch according to another embodiment of the invention is generally indicated at 200. The switch 200 includes a support bracket 202. First 204 and second 206 switches are fixedly secured to the support bracket 202. The first switch 204 allows opening and closing of a circuit that provides a signal indicating the correct position of the locating pin 18 in the second opening 45. The second switch 206 allows opening and closing of a circuit that provides a signal indicating the locked state of the hook 50.

A toggle 208 is pivotally coupled to the support bracket 202 by a pivot pin 210 for movement between engaged and disengaged positions. The toggle 208 includes first 212 and second 214 arms extending radially outwardly from generally opposite sides of the pivot pin 210. In the engaged position, the first arm 212 presses a button on the first switch 204, thereby opening the circuit to indicate that the locating pin 18 is not located in the second opening 45, i.e. no signal is provided by the first switch 204. The second arm 214 is presented for engaging the locating pin 18 as the pin 18 is inserted through the second opening 45. The toggle 208 rotates clockwise as viewed in FIGS. 11 and 12 toward the disengaged position as the locating pin 18 is inserted through the second opening 45 and makes contact with the second arm 214. In the disengaged position, the first arm 212 is lifted off the button, thereby closing the first switch 204. A signal is provided by the first switch 204 to indicate the locating pin 18 is properly seated in the second opening 45. A biasing member 216 is energized between the support bracket 202 and the toggle 208 for continuously biasing the toggle toward the engaged position.

Referring to FIG. 13, the second switch 206 is mounted on the opposite side of the support bracket 202 relative to the toggle 208. A spring metal arm 220 is secured to the second switch 206 for pressing and releasing a button 222 on the second switch 206. Pressing the button 222 closes a circuit to provide a signal indicating that the anti-rotation lever 52 is engaged with the edge 54 of the latch hook 50, i.e. the latch hook 50 is in the locked position. More specifically, a third arm 224 and the anti-rotation lever 52 are both fixedly secured to a common pivot pin 226, so that the third arm 224 rotates with the anti-rotation lever 52 about the pivot pin 226. As the anti-rotation lever 52 rotates toward engagement with edge 54 of the latch hook 50, the third arm 224 contacts the arm 220. The arm 220, in turn, presses the button 222 on the second switch 206. The second switch 206 provides a signal indicating that the anti-rotation lever 52 is engaged with the edge 54 to maintain the hook 50 in the locked position. The button 222 remains pressed while the anti-rotation lever 52 is engaged with the hook 50. Rotation of the anti-rotation lever 52 clockwise out of engagement with hook 50 allows the arm 220 to spring back to its default position spaced apart from the button 222, thereby opening the circuit and canceling the signal.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

We claim:

1. A latch assembly for selectively locking a front portion of a convertible top to a windshield header, the latch assembly comprising:
a frame;
a pair of latch mechanisms each lockingly engagable with a corresponding striker bar on the front portion of the convertible top;
a pair of arms coupled to the latch mechanisms for moving the latch mechanisms between locked and unlocked position relative to the striker bars in response to a substantially axial displacement of the arms, the arms having opposing and spaced apart gear racks;
a pinion gear engaged between the gear racks of the arms so that movement of one arm in one direction causes movement of the other arm in an opposite direction;
a control arm coupled to one of the arms such that movement of the control arm causes movement of the one of the arms, the control arm having a movable pin that is slidably coupled to a slot on the frame;
an actuator coupled to the control arm by the movable pin to cause actuation of the locking mechanism between locked and unlocked positions; and
the frame supporting the latch mechanisms, the arms, the pinion gear and the actuator so that the entire latch assembly can be is assembled to a windshield header as a unit.

2. A latch assembly as set forth in claim 1, wherein the frame includes a pair of housings for the latch mechanisms, each housing having a first opening through which the striker bar is received and presented for lockingly engaging the latch mechanism in the locked position.

3. A latch assembly as set forth in claim 2, wherein the first opening is defined by substantially orthogonal slots, one of the slots receiving the striker bar therethrough for locking engagement with the latch mechanism, the other of the slots accommodating movement of the latch mechanism between the locked and unlocked positions.

4. A latch assembly as set forth in claim 3, wherein at least one of the housings has a second opening for receiving a locating pin on a front portion of a convertible top.

5. A latch assembly as set forth in claim 4 including a switch assembly that provides both a first circuit that upon closing forms a signal indicating that the latch mechanism is lockingly engaged with the striker bar and a second circuit that upon closing forms a signal indicating that a locating pin is seated in the second opening of the housing, both first and second circuits being mechanically biased toward a closed state.

6. A latch assembly as set forth in claim 5, wherein the switch assembly includes a bracket and a toggle, the toggle being pivotally coupled to the bracket by a toggle pivot for movement between an engaged position and a disengaged position.

7. A latch assembly as set forth in claim 6, wherein the toggle includes a first arm that extends outwardly relative to the toggle pivot, the first arm maintaining the first circuit in an open state while the toggle is in the engaged position.

8. A latch assembly as set forth in claim 7, wherein the toggle includes a second arm that extends outwardly from an opposite side of the toggle pivot relative to the first arm, the second arm being presented for engaging a locating pin as the locating pin is inserted into the second opening of the at least one of the housings, the engagement between the second arm and the locating pin causing pivotal movement of the toggle toward the disengaged position, wherein the first arm allows the first circuit to move to the closed state.

9. A latch assembly as set forth in claim 2, wherein the frame includes a gear housing for the pinion gear, the gear housing having substantially parallel slots for slidably supporting the arms.

10. A latch assembly as set forth in claim 9, wherein the latch housings and gear housing are integrally formed as a unit with the frame, the frame being formed from plastic.

11. A latch assembly as set forth in claim 1, wherein the control arm has one end pivotally coupled to the frame and an opposite end coupled to one of the arms by an additional pin.

12. A latch assembly as set forth in claim 11, wherein the slot is substantially linear and tangential with respect to the pivotal movement of the control arm.

13. A latch assembly as set forth in claim 1, further comprising an output link pivotally coupled to the control arm, said output link being driven by the actuator so as to cause pivotal movement of the control arm, which in turn causes corresponding displacement of the one of the arms.

14. A latch assembly as set forth in claim 1, including a pair of linkages connecting the actuator to the one of the arms, the control arm being one of the pair of linkages.

15. A latch assembly for selectively locking a front portion of a convertible top to a windshield header, the latch assembly comprising:
a frame;
a pair of latch mechanisms each having a hook movable between locked and unlocked states;
an arm coupled to each latch mechanism, each arm being movable between locked and unlocked positions to cause corresponding movement of the hook in and out of the locked state, the arms having opposing and spaced apart gear racks;
a pinion gear engaged between the Rear racks of the arms so that movement of one arm in one direction causes movement of the other arm in an opposite direction;
a control arm coupled to one of the arms such that movement of the control arm causes movement of the latch mechanisms, the control arm having a movable pin that is slidably coupled to a slot on the frame;
an actuator operatively coupled to the control arm by the movable pin between the latch mechanisms for actuating the hooks between locked and unlocked states; and
the frame supporting both the latch mechanisms and the actuator so that the entire latch assembly can be assembled to a the windshield header as a unit.

16. A latch assembly as set forth in claim 15, wherein the frame includes a pair of housings for supporting the latch mechanisms, each housing having a first opening through which a striker bar may be received and presented for lockingly engaging the hook in the locked state.

17. A latch assembly as set forth in claim 16, wherein the first opening is defined by substantially orthogonal slots, one of the slots for receiving a striker and the other of the slots accommodating movement of the hook between the locked and unlocked states.

18. A latch assembly as set forth in claim 15, wherein the frame is formed from plastic.

19. A latch assembly as set forth in claim 15, wherein the control arm has one end pivotally coupled to the frame and an opposite end coupled to the latch mechanisms by an additional pin.

20. A latch assembly as set forth in claim 15, wherein the slot is substantially linear and tangential with respect to the pivotal movement of the control arm.

21. A latch assembly as set forth in claim 15, further comprising an output link coupled to the control arm by the movable pin, said output link being driven by the actuator so as to cause pivotal movement of the control arm.

22. A latch assembly as set forth in claim 15, wherein:
each latch mechanism further includes a lever movable in and out of engagement with an edge on the hook, the lever maintaining the hook in a locked position with the striker bar while engaged with the edge; and
each arm having a cam surface engagable with the lever, each arm and each hook being coupled together in a lost motion arrangement so that the cam surface first displaces the lever from the edge of the hook during movement of each arm from the locked position prior to moving the hook from the locked position.

23. A latch assembly as set forth in claim 22, wherein each arm includes a longitudinally extending slot.

24. A latch assembly as set forth in claim 22, wherein each lever includes an outwardly protruding tab that engages the cam surface during movement of the arm from the locked position toward the unlocked position to cause displacement of the lever from the edge of the hook.

25. A latch assembly for selectively locking a front portion of a convertible top to a windshield header, the latch assembly comprising:
a pair of latch mechanisms each having a hook movable between locked and unlocked states each hook having a pin extending outwardly therefrom, each latch mechanism including a lever movable in and out of engagement with an edge on the hook, the lever maintaining the hook in a locked state;
arms coupled to a respective latch mechanism, each arm being movable between locked and unlocked positions to cause corresponding movement of the hook in and out of the locked state, each arm having a cam surface engagable with the lever, each arm having a longitudinally extending slot defined therein that is coupled to the pin extending from the hook such that each arm and hook are coupled together in a lost motion arrangement so that the cam surface first displaces the lever from the edge of the hook during movement of each arm from the locked position prior to moving the hook from the locked state;
the arms further having opposing and spaced apart gear racks;
a pinion gear engaged between the near racks of the arms so that movement of one arm in one direction causes movement of the other arm in an opposite direction;
an actuator operatively coupled to one of the arms between the latch mechanisms for actuating the hooks between locked and unlocked states; and
a frame supporting both the latch mechanisms and the actuator so that the entire latch assembly can be assembled to a windshield header as a unit.

\* \* \* \* \*

UNITED STATES PATENT AND TRADEMARK OFFICE
CERTIFICATE OF CORRECTION

PATENT NO. : 7,559,585 B2  
APPLICATION NO. : 11/201455  
DATED : July 14, 2009  
INVENTOR(S) : Frank Plesternings et al.

Page 1 of 1

It is certified that error appears in the above-identified patent and that said Letters Patent is hereby corrected as shown below:

On the title page item (57), line 1, Abstract, please change "is provides" to --provides--

Col. 4, line 14: replace "the housing gear housing" with --the gear housing--

Col. 7, line 26: replace "assembly can be is assembled" with --assembly is assembled--

Col. 10, line 17: replace "the near racks" with --the gear racks--

Signed and Sealed this

Twenty-seventh Day of October, 2009

David J. Kappos
*Director of the United States Patent and Trademark Office*